United States Patent
Spratt et al.

(10) Patent No.: US 11,030,221 B2
(45) Date of Patent: Jun. 8, 2021

(54) SYSTEM FOR FAST AND SECURE CONTENT PROVISION

(71) Applicant: ONLYSIX LIMITED, London (GB)

(72) Inventors: Tim Spratt, London (GB); Joe Root, London (GB)

(73) Assignee: PERMUTIVE LIMITED, London (GB)

(*) Notice: Subject to any disclaimer, the term of this patent is extended or adjusted under 35 U.S.C. 154(b) by 47 days.

(21) Appl. No.: 15/852,220

(22) Filed: Dec. 22, 2017

(65) Prior Publication Data

US 2019/0197179 A1 Jun. 27, 2019

(51) Int. Cl.
| | |
|---|---|
| G06F 21/62 | (2013.01) |
| H04L 29/08 | (2006.01) |
| G06F 16/28 | (2019.01) |
| G06F 16/958 | (2019.01) |

(52) U.S. Cl.
CPC .......... *G06F 16/285* (2019.01); *G06F 16/958* (2019.01); *G06F 21/6245* (2013.01); *H04L 67/02* (2013.01); *H04L 67/306* (2013.01)

(58) Field of Classification Search
CPC .... G06F 16/28; G06F 16/958; G06F 21/6245; G06F 16/285; H04L 67/02; H04L 67/306
See application file for complete search history.

(56) References Cited

U.S. PATENT DOCUMENTS

| | | | |
|---|---|---|---|
| 7,769,764 B2 | 8/2010 | Ramer et al. | |
| 8,326,630 B2 | 12/2012 | Chandrasekar et al. | |
| 8,806,187 B1 | 8/2014 | Vemula et al. | |
| 9,280,749 B1* | 3/2016 | Porteous | H04N 21/25841 |
| 2002/0169971 A1* | 11/2002 | Asano | H04L 9/3273 |
| | | | 713/193 |
| 2006/0100857 A1* | 5/2006 | Wissink | G06F 40/129 |
| | | | 704/10 |
| 2007/0031010 A1* | 2/2007 | Sukegawa | G06K 9/00288 |
| | | | 382/118 |
| 2009/0172014 A1 | 7/2009 | Huetter | |
| 2009/0228474 A1 | 9/2009 | Chiu et al. | |
| 2011/0283355 A1* | 11/2011 | Livshits | G06F 16/958 |
| | | | 726/22 |
| 2011/0313844 A1 | 12/2011 | Chandramouli et al. | |
| 2016/0098265 A1* | 4/2016 | Mahajan | H04L 67/34 |
| | | | 717/170 |
| 2017/0070392 A1* | 3/2017 | Patel | H04L 67/42 |

OTHER PUBLICATIONS

International Search Report and Written Opinion—PCT/GB2018/053740—ISA/EPO—dated Feb. 27, 2019.

\* cited by examiner

*Primary Examiner* — Christopher B Robinson
(74) *Attorney, Agent, or Firm* — Haynes and Boone, LLP (57) ABSTRACT

A method for displaying content to a user at a user device, the method comprising: initiating, at the user device, a web element request indicative of a web element; transmitting, at a web element server, the web element to the user device in response to the web element request; receiving, at a code provisioning server, a code portion request in response to the web element request; transmitting, at the code provisioning server, a code portion to the user device in response to the code portion request; executing, at the user device, the code portion in response to the web element request, wherein executing the code portion causes a processor at the user device to: collate user data at the user device; and generate an instruction to execute an action based on the collated user data.

19 Claims, 8 Drawing Sheets

SYSTEM FOR FAST AND SECURE CONTENT PROVISION

TECHNICAL FIELD

This disclosure relates to a system, a server, a user device, a method and a computer program for providing specific content to a user in a fast and secure manner.

BACKGROUND

In modern environments, the identification and the provision of data and digital content to users is of great importance. In particular, the accurate identification of specific content and the speed at which the content can be provided to users is the focus of a great deal of technological research and development.

Data and digital content can take many forms such as medical data, statistical data, scientific research data and personalised content based on user data etc. The present invention is directed towards enhancing the speed and accuracy at which data can be provided to users in general. However, the provision of personalised content is described herein as a specific application of the present invention, which illustrates the technical advantages provided.

In conventional computing environments, when a user first visits a website with embedded content which is user-specific, often the content shown has been inaccurately identified (or is not relevant to the user). This is likely to be because either the content selection process does not have any user information upon which to base its selection, or the system needs time to build up a user profile to which content can be matched by sending and gathering user information in the 'cloud'.

In existing systems, the time to transmit, process and analyse user data in the cloud takes in the order of 12-24 hours and might be incomplete before the user's subsequent visits to the website. This long time-frame is problematic.

Additionally, in traditional systems, creating a new category in which to place a particular user (also known as an advertising target 'segment') involves processing vast amounts of user data in the cloud. This takes a large amount of time and can be a 'bottleneck' for fast, efficient segment updates. This can lead to a loss of targeting opportunity as a result of the time delay between the segment being defined and it being implemented.

At present, most content personalisation platforms use a batch-based processing model. This involves collecting data related to user behaviour, storing the profiling information data, and then running analysis software to determine possible products of interest for a given user, based on pattern matching and applying rules to users in a given category.

This approach presents a number of limitations. Firstly, it is limited in that when processing is required based on new categorisation metrics, the captured data may not be sufficient in order to apply these rules, and running user categorisation on these rules may only be possible on future gathered data. Secondly, new queries, which are in essence a more complex form of segment, are typically only run on new data, whereas an ideal solution would be able to analyse past data to make these queries useful immediately. Thirdly, this analysis engine will usually be implemented server side, and will therefore fail to capture any offline activity, which is crucial for the use case when the user devices are mobile in that they may move in and out of connectivity during a session.

Typically, web customisation platforms will collect large amounts of data about users, and will then batch process this data at the server in order to run queries and allow insight into segments and statistics. These are typically run once every 24 hours, resulting in a substantial lag before the customer profiling information can be used for e.g. advertising. This will result in a loss of effectiveness at times, e.g. when user behaviour is highly variable and speed focussed when users are likely to be browsing very rapidly for a short period of time only with limited chance of a revisit. Whilst some real-time analysis platforms exist, they will typically simplify the data used in order to provide a live component e.g. use current location only—or are proprietary to the service e.g. Gmail and other Google products.

There is a concern that as a result of the rise in the number of mobile phones, tablets, laptops and other personal, internet-connected device, and the anticipated dramatic increase in IoT devices in the coming years, the volume of data gathered is expected to grow to such an extent that the timely transmission to, and processing of, the captured data in cloud-based centralised servers will present a significant technical challenge. The limited available transmission bandwidth is likely to be a constraint which further slows the data processing process down.

In light of the above, there is a need to provide a system which alleviates at least some of the technical problems identified herein.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect, there is a method for displaying content to a user at a user device, the method comprising: initiating, at the user device, a web element request indicative of a web element; transmitting, at a web element server, the web element to the user device in response to the web element request; receiving, at a code provisioning server, a code portion request in response to the web element request; transmitting, at the code provisioning server, a code portion to the user device in response to the code portion request; executing, at the user device, the code portion in response to the web element request, wherein executing the code portion causes a processor at the user device to collate user data at the user device; and generate an instruction to execute an action based on the collated user data.

In the method, it is possible to execute an action (e.g. identify and display content to a user) that is based on user data (or is user-specific) by collating the user data at the device without transmitting the data to an external device. This provides enhanced security in that user data is not made available to potentially unsecure devices. In addition, since the user data is processed at the user device, this distributes the processing burden involved in collating user data. This may be particularly advantageous for a plurality of users, where the number of users is large, for instance in the order to tens of thousands, hundreds of thousand or even millions of users.

Although displaying content based on the collated user data is provided as an example of the action executed based on user data, it is envisaged that other actions could be executed instead of or in addition to displaying this content. For example, when the segment or query associated with a particular user changes in response to events, the action executed could be any action that can be taken on the device by the code portion at the user device, where displaying content is just one example. In one example, in response to a segment changing, an action could be executed to make an API call to flag a user as having some affinity for a particular topic of interest, for instance within an audience API of a social network such as Facebook. In this example, it is possible that no content would be displayed to the user, but instead the flag is set for targeting the user via the social network at a later date. In another example, the action executed may relate to email, for instance the action may cause an email to be transmitted based on the collated user data.

The method may further comprise transmitting, at the web element server, a code snippet to the user device in response to the web element request; executing, at the user device, the code snippet to initiate the code portion request. In this way, it is possible to cause the user device to issue the code portion request as opposed to the web element server being required to initiate this request. Although, it is quite possible in some embodiments that the web element server may issue the code portion request to the code provisioning server not via the user device. In another embodiment, the web element server and the code provisioning server may be comprised within the same server.

Executing the code portion may cause a processor at the user device to associate the user with at least one of a plurality of categories. The content may be selected based on the at least one category associated with the user. In this way, it is possible to associate the user data with a single category rather than storing the collated user data as a whole. For instance, once the category for the user has been established, it may be possible to discard the collated user data, but to retain the user in association with the category. Thus, it is possible to reduce the amount of data storage required by the method.

Associating the user with at least one of a plurality of categories may comprise detecting if the collated user has transitioned from a negative state of not matching a criterion of at least one of a plurality of categories to a positive state of matching the category. Associating the user with at least one of a plurality of categories may comprise detecting if the collated user has transitioned from a positive state of matching a criterion of at least one of a plurality of categories to a negative state of not matching the category. Associating the user with at least one of a plurality of categories may comprise detecting if the collated user matches a criterion of at least one of a plurality of categories.

Generating the content instruction may comprise transmitting, from the user device to a content server, the content instruction comprising a data item indicative of at least a portion of the collated user data. In this way, it is possible for the content server to accurately identify the content intended for provision to the user device.

The instruction to execute an action may comprise a content instruction to display content at the user device, wherein the content is based on the collated user data; and wherein executing the code portion causes a processor at the user device to display the content in response to the content instruction. Generating the content instruction may comprise transmitting, from the user device to a content server, the content instruction comprising a data item indicative of the at least one category. Transmitting the category (e.g. in the absence of the total collated user data) is beneficial since it reduces the quantity of data transmitted, thus reducing bandwidth usage and the storage burden. In addition, transmitting the category avoids the transmission of potentially sensitive user data to other devices and third-parties which enhances security and privacy.

The content instruction may be transmitted from the user device to the content server via a data enrichment server. The data enrichment server may provide additional user to the collated user data. The collated user data may be combined with data extracted from the web element. The data from the web element may be extracted by the data enrichment server. The collated user data may be combined with geolocation data indicative of an estimate of the position of the user. The geolocation data may be generated by the data enrichment server. Thus, data can be based on user data can be identified more accurately.

The content server may be arranged to transmit the content based on the portion of collated user data or the at least one category to the user device, in response to the content instruction. In this way, the content server is able to provide the content as opposed to the content being provided by the user device. Thus, the content can be selected from a larger range of possible content items.

The method may further comprise defining a plurality of categories at the code provisioning server; and transmitting at least a subset of the plurality of categories to the user device in response to the code portion request. At least one, or all, of the plurality of categories may be user defined.

Defining a category may comprise selecting at least one criterion for the category; and wherein associating the user with a category comprises matching at least a portion of the collated user data with the at least one criterion of the category.

Displaying the content in response to the content instruction may comprise embedding the content in the web element.

The method may further comprise initiating, at the user device, an additional web element request indicative of a web element; determining that a version of the code portion at the user device corresponds with a version of the code portion at the code provisioning server. In this way, it is possible to ensure that a recent version of the code portion is executed. This may avoid the unnecessary processing burden of executing a code portion that is out-of-date.

The method may further comprise receiving the version of the code portion at the code provisioning server, in response to determining that the version of the code portion at the user device does not correspond with a version at the code provisioning server. The version of the code portion may be a recent version or the most recent version.

The method may further comprise initiating, at the user device, an additional web element request indicative of a web element; executing, at the user device, the code portion in response to the additional web element request, wherein executing the code portion causes a processor at the user device to collate user data at the user device; generating a content instruction to display content at the user device, wherein the content is based on the collated user data; and displaying the content in response to the content instruction. In this way, it is possible to avoid the processing, bandwidth and storage burden of re-downloading the code portion for execution.

The web element may comprise a webpage. The web element may comprise video content. The web element comprise an online game. At least a portion of the collated user data may be received from an internet-enabled device in proximity to the user.

Accordingly to another aspect, there is a method for displaying content to a user at a user device, the method comprising: receiving, at a code provisioning server, a code portion request in response to a web element request initiated at the user device; and transmitting a code portion to the user device in response to the code portion request; wherein the code portion is arranged be executed at the user device and cause a processor at the user device to: collate, at the user device, user data; and generate an instruction to execute an action based on the collated user data.

Accordingly to another aspect, there is a method for displaying content to a user at a user device, the method comprising: initiating, at the user device, a web element request indicative of a web element; receiving, at the user device, a code portion in response to the web element request from a code provisioning server; executing, at the user device, the code portion in response to the web element request, wherein executing the code portion collates user data at the user device; receiving, at the user device, the web element corresponding with the web element request from a web element server, in response to the web element request; and generating an instruction to execute an action based on the collated user data.

Accordingly to another aspect, there is a method for displaying content to a user at a user device, the method comprising: receiving, at a web element server, a web element request indicative of a web element from the user device; transmitting, at the web element server, the web element and a code snippet to the user device in response to the web element request; wherein the code snippet is arranged be executed at the user device and cause a processor at the user device to: collate, at the user device, user data; and generate an instruction to execute an action based on the collated user data.

Accordingly to another aspect, there is a system for displaying content to a user, the system comprising a user device, a web element server and a code provisioning server: wherein the user device is arranged to initiate a web element request indicative of a web element; the web element server is arranged to transmit the web element to the user device in response to the web element request; the code provisioning server is arranged to receive a code portion request in response to the web element request; the code provisioning server is arranged to transmit a code portion to the user device in response to the code portion request; the user device is arranged to execute the code portion in response to the web element request, wherein executing the code portion causes a processor at the user device to collate user data at the user device; generate an instruction based on the collated user data.

Accordingly to another aspect, there is a server for displaying content to a user at a user device, the server comprising a processor configured to perform the steps of: receiving a code portion request in response to a web element request initiated at the user device; and transmitting a code portion to the user device in response to the code portion request; wherein the code portion is arranged be executed at the user device and cause a processor at the user device to: collate, at the user device, user data; and generate an instruction to execute an action based on the collated user data.

Accordingly to another aspect, there is a user device for displaying content to a user, the user device comprising a processor configured to perform the steps of: initiating a web element request indicative of a web element; receiving a code portion in response to the web element request from a code provisioning server; executing the code portion in response to the web element request, wherein executing the code portion collates user data at the user device; receiving the web element corresponding with the web element request from a web element server, in response to the web element request; generating an instruction to execute an action based on the collated user data.

Accordingly to another aspect, there is server for displaying content to a user at a user device, the server comprising a processor configured to perform the steps of: receiving a web element request indicative of a web element from the user device; transmitting the web element and a code snippet to the user device in response to the web element request; wherein the code snippet is arranged be executed at the user device and cause a processor at the user device to: collate, at the user device, user data; and generate an instruction to execute an action based on the collated user data.

Accordingly to another aspect, there is a server for displaying content to a user at a user device, the server comprising a processor configured to perform the steps of: receiving user data from a user device, collated by a code portion executed on the user device in response to a web element request; identifying content based on the collated user data; and transmitting the content identified to the user for display at the user device.

Accordingly to another aspect, there is a computer program comprising instructions which, when the program is executed by a computer, cause the computer to carry out the method described herein.

Accordingly to another aspect, there is a computer-readable medium comprising instructions which, when executed by a computer, cause the computer to carry out the method described herein.

A data carrier signal carrying the computer program described herein.

BRIEF DESCRIPTION OF THE DRAWINGS

Various embodiments of the invention will be described, by way of example only, with reference to the following drawings, in which.

DETAILED DESCRIPTION

The examples described herein solve both of the above problems by processing each user's information on their own device(s), utilising so called "edge computing" i.e. by distributing processing tasks away from a centralized point. In addition, instead of processing the entire database every time a user triggers an event, e.g. by visiting a webpage, the system stores a state which is iteratively updated with each new event.

The system architecture and edge processing of the invention allows user information to be gathered, users to be segmented, and targeted adverts sourced within the first few hundred milliseconds of requesting to load a webpage, and will therefore be completed within the time taken to load the webpage.

Processing new or updated segments on the edge is quicker, as there is no data transmission delay, and there is no problem associated with available transmission bandwidth. Provided the historical user data 'state' contains the necessary information to calculate the segment, there is also no need to process all of the historic user data, saving a substantial amount of time, because the information in the state will already be up to date.

The invention comprises a system of internet-connected devices capable of detecting and processing a user or device input, a centralised server-based database, and an internet-based network connecting the user devices with the database. One key benefit of the invention is the ability to process very large volumes of data (e.g. processing millions of events per minute, where each event involves processing over 1 kilobyte of data), partitioned by user or device inputs, in near-real-time by utilising local, on-device processing.

The present invention may provide a platform which addresses the above problems in the prior art and thereby enables near-real-time processing of user or device behaviour from historic and future data. The edge-processing solution is also scalable so it can cope with a very large volume of data from a large number of internet-connected devices (e.g. hundreds of millions of devices) while solving the issue of transmission bandwidth and limited available cloud-based processing power.

The invention is a system for displaying relevant content (e.g. advertisements) to specifically targeted user-types, comprising a plurality of user internet-connected devices and centralised server-based databases which can transmit data to, and receive data from, the user devices via the internet.

There is described herein a hybrid computing system for delivering user-targeted content whereby the majority of the computational processing of user data or device input data is done locally, on the distributed devices; so-called "edge computing". A subset of the data captured is stored on the devices and the full dataset is stored on a centralised, cloud-based database. Analytics of the whole dataset can be carried out on the servers in the cloud. The availability of segments and ease in which segments can be distributed to devices straight after being constructed is particularly advantageous.

The utilisation of the distributed devices' processing means to process each user's data, with knowledge of current segments at the edge, with no requirement to do process-intensive joining in the cloud, combined with an immutable ledger data storage structure, results in processing speeds of the order of milliseconds, or effectively real-time. Targeted content can therefore be embedded within a webpage before it has finished loading. This allows content producers to engage with their target audience from the first visit to a website; they no longer have to rely on repeat visits of a user to their website, when the data processing and transmission will have been carried out, to deliver personalised content. Since the segments to which users belong to are known both on the device and in real-time, all events are enriched by the segments the user was in at the time the event occurred, as a property of the event containing a list of the segment IDs. Including the current segments for users means some computationally expensive joining operations can be avoided. For example, a segment of the form 'did perform event 'X' and was in segment 'S' at the time' can be formed without having to recalculate whether the user was in segment 'S' at the time.

The platform can handle a vast volume of data for every user which is therefore likely to increase the accuracy of the platform in targeting content at users. The utilisation of edge computing on the users' devices also means that gathering and processing such a high quantity of data (e.g. billions of events every day, for hundreds of millions of users every month) is possible as the number of users and devices increases; it is a scalable solution.

The system can also be used to take advantage of header bidding. The creation of key value pairs in the platform, based on the segmentation of the user, is fed into the ad exchange. This additional information enables advertising companies interested in displaying their content to a given segment of user to bid for that user. The system is able to increase the time available for bidding.

Another advantageous feature of the invention is the high degree of personalisation of the user segmentation. In the disclosed invention, a segment may be created from a wide variety of user and webpage attributes and data. Any generic data can be captured with arbitrary complexity. In addition, the logic applied, in the form of queries, can be complex. This results in an advantage over existing art in that users can have far greater control over the segments they create.

The system is also advantageous in its reduced complexity and cost to run. The use of hybrid processing means that large computer processing facilities are not required on the same scale that a cloud-based system would require.

Due to the use of local processing and storage, the system has increased robustness to connectivity issues.

The invention proposed herein may provide a system capable of processing a large volume of user-generated data, partitioned by user, and to use this to deliver highly personalised, relevant actions or reactions to a user in real-time. It is the intent of the invention to provide targeted content through user data processing and segmentation to the user from their first visit to a webpage.

Another advantage of the invention is to enable near-real-time (e.g. in the order of millisecond or seconds) implementation of a new or updated segment of users. The time of implementation of a new or updated segment is a function of the number of events recorded previously for a particular device/user.

By utilising the local processing power of the devices through the use of edge computing, it is another object of the invention to function with IoT devices and provide a platform which can be scaled-up as the number of internet-connected or IoT devices is expected to rise significantly, and the data the devices gather is expected to grow rapidly.

It is another advantage of the invention to provide a platform which synchronises the user's data across multiple devices (e.g. smartphone, desktop, tablet) and the cloud server database such that the personalisation of the content delivered to the user is based on all of the available collected user data.

It is another advantage of the invention to source additional user profiling information from 3rd parties and enrich the incoming data so as to expand the volume of user data collected and offer a broader range of attribute to segment users with.

It is another advantage of the invention to offer a complex query language to define and provide highly personalised segmentation (e.g. based on average basket value), and thus targeting, of users with the platform.

The present invention comprises a web analytics platform for advertising, content recommendation and personalisation, with potential future applications in IoT. The aim of the invention is to provide scalable, real-time relevant content-delivery solutions for customers.

Although the embodiment detailed here describes a method for presenting relevant, targeted advertising, it should be appreciated that it could be used to provide actions or to react in many different forms including showing relevant digital content of any kind. Although the specific embodiments described herein relate to a method for presenting relevant, targeted advertising, it should be appreciated that the embodiments could be used to provide actions or to react in many different forms including showing relevant digital content of any kind or sending targeted data to third-party services.

The key aspect of the invention is the ability to process very large volumes of data, partitioned by user or device inputs, in real-time by utilising the local processing capabilities of the distributed user devices.

An event may comprise any form of interaction from a device or a user. This could be, for example, a visit of a user to a webpage, or a temperature reading made at a device.

System Architecture

Figure 1:
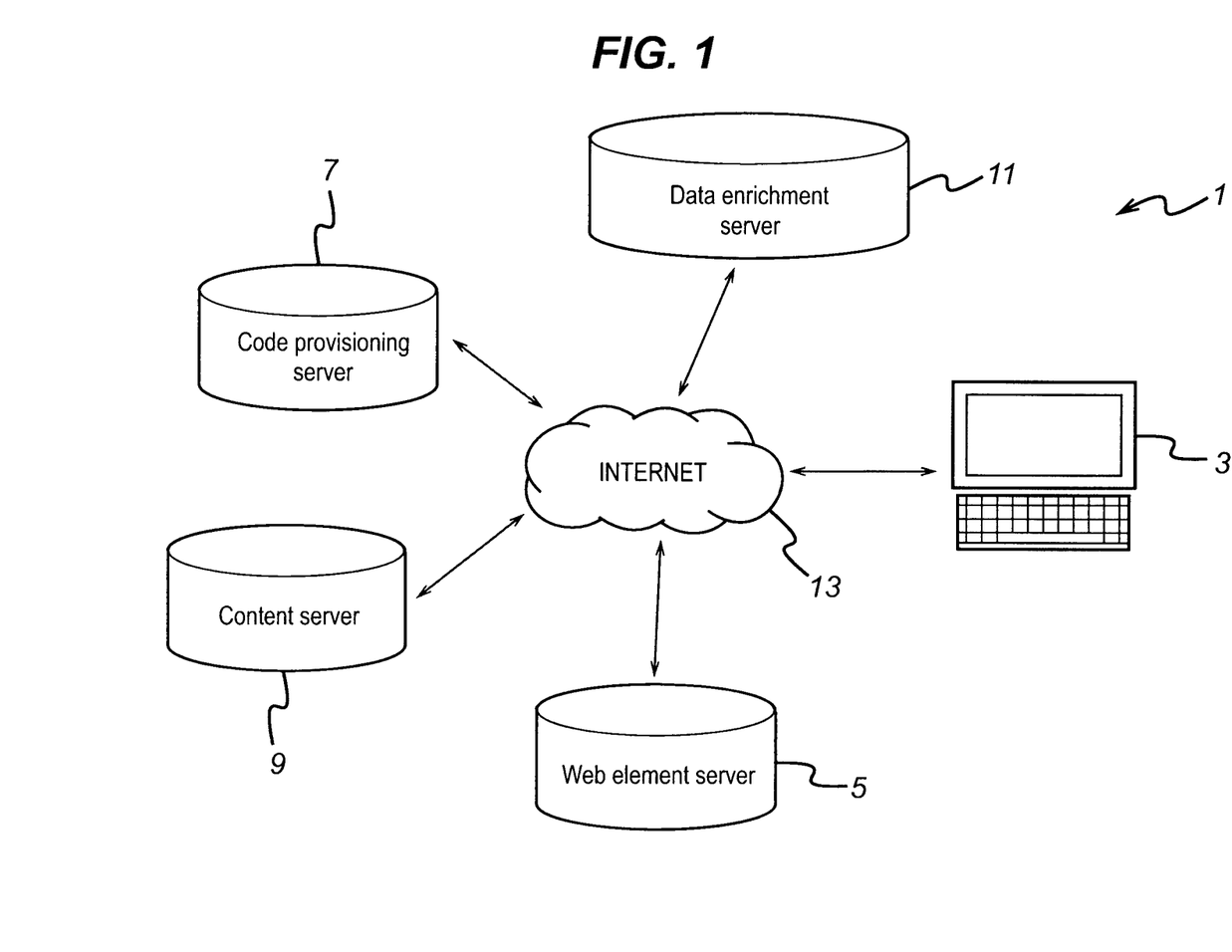
FIG. 1 illustrates a schematic of a system for fast and secure content provision.

FIG. 1 illustrates the general architecture of a system 1 for fast and secure provision of content. The system 1 comprises computing/electronic devices including a user device 3 (e.g. device 200), a web element server 5 (e.g. web hosting system 206), a content server 9 (e.g. distribution system 222), a code provisioning server 7 (e.g. cloud server system 209), and a data enrichment server 11 (e.g. data enrichment sources 215).

The computing devices 3, 5, 7, 9, 11 are arranged to communicate with one another via a communications network 13. The communications network 13, in this example, is the Internet 13. However, it will be appreciated that any suitable form of communications network 13 could be used.

The computing devices 3, 5, 7, 9, 11 are web-enabled by including an embedded browser or "app" or similar. In addition, each device 3, 5, 7, 9, 11 may comprise a display, a UI, a processor and memory.

The devices 3, 5, 7, 9, 11 can be arranged to communicate data between one another via any suitable communications protocol or connection. For instance, the devices 3, 5, 7, 9, 11 may communicate with one another via a wired and/or a wireless connection.

Overview of the Method

Figure 2:
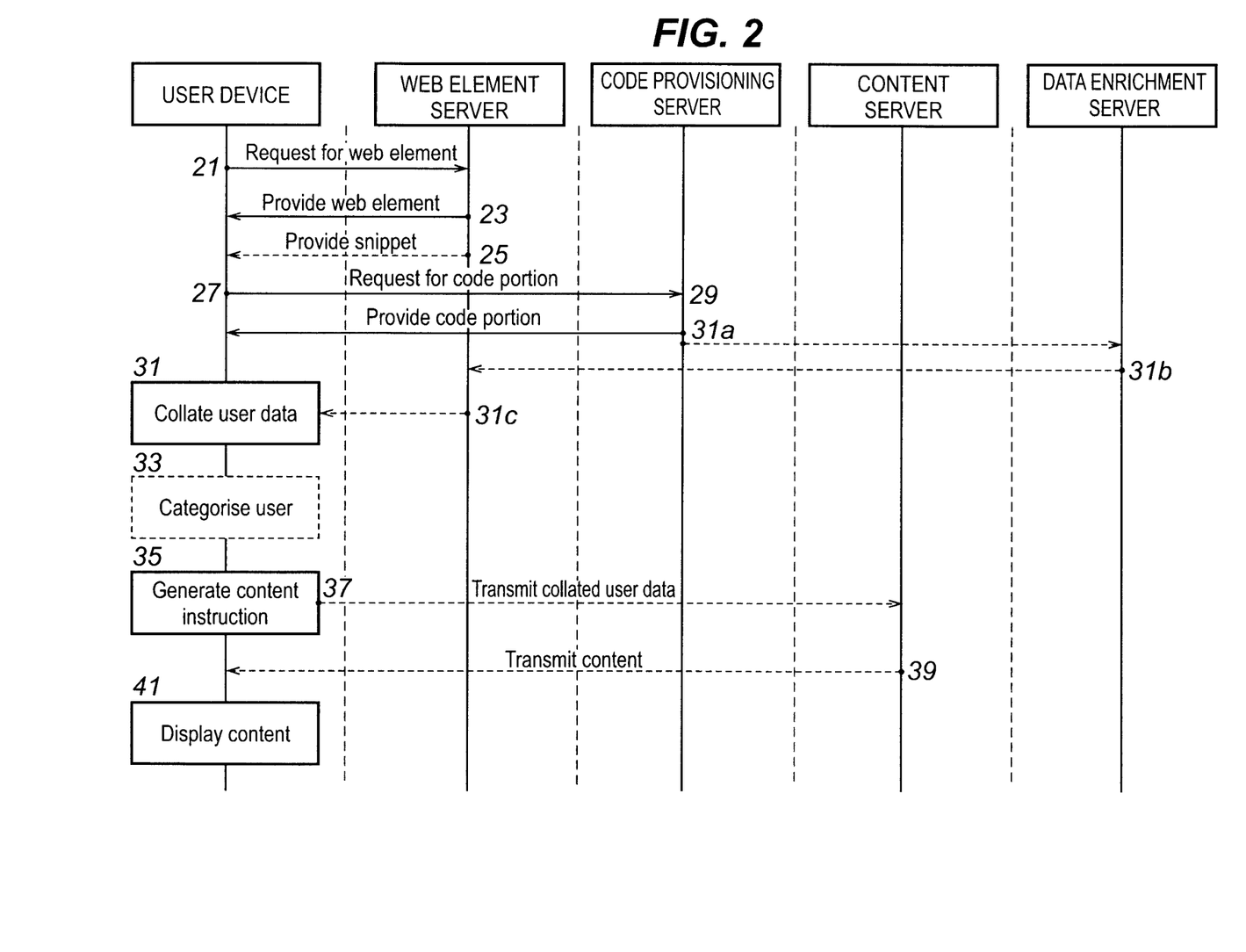
FIG. 2 illustrates a flow chart illustrating a method performed by the system.

FIG. 2 illustrates a flow chart of a method performed by the system 1. In step 21, a user of the user device 3 initiates a request for a web element, such as a webpage, which is transmitted to the web element server 5. In step 23, the web element server 5 responds to the webpage request by providing the webpage to the user device 3. In step 25, the web element server 5 may optionally transmit a portion of code or "code snippet" to the user device 3, in response to the webpage request also. In step 27, the code snippet is executed at the user device 3, which transmits a request for a code portion to the code provisioning server 7. In an alternative embodiment, the web element server 5 may transmit the code portion request to the code provisioning server 7 without first transmitting the code snippet to the user device 3. In another example, the web element server 5 and the code provisioning server 7 may be the same server and thus request for the code portion is not required to be transmitted externally, but instead the code portion request passes to the code provisioning part of server from the web element part of the server within the same server.

In step 29, the code portion is provided to the user device 3. In step 31, the code portion is executed at the user device 3 to collate user data. The user data may be collated using data stored at the user device 3 and/or data may be collated from external sources at the user device 3. In optional steps 31a-c, the user data may be supplemented by the data enrichment server 11 which may respond to a request for additional user data in step 31a. The additional user data may comprise data extracted from the web element, geolocation data associated with the user and/or further data associated with the user. This data may be transmitted to the web element server 5 without the need to respond the request in step 31a. This data may be transmitted by the data enrichment server 11 routinely. The user data may be forwarded to the user device 3 in step 31c.

In optional step 33, the user data is used to categorise the user, for instance if the user data matches at least one criterion associated with a category. In step 35, an instruction to execute an action (e.g. a content instruction) is generated at the user device 3. The content instruction may comprise an instruction for data already stored at the user device 3 to be presented to a user. For instance, the content instruction may cause webpage data to be revealed to the user, for example via a "pop-up" window. In step 41, the action is executed, for instance the content may be displayed to the user. Optionally, the content instruction may comprise steps 37 and 39 in which an instruction is transmitted to the content server 9. This instruction may comprise a data item indicative of the collated user data and/or the category of the user. In step 39, the content server 9 matches the data item with a content item and transmits the content to the user device 3. In step 41, the identified content is displayed at the user device 3.

Although displaying content based on the collated user data is provided as an example of the action executed based on user data, it is envisaged that other actions could be executed instead of or in addition to displaying this content. For example, when the segment or query associated with a particular user changes in response to events, the action executed could be any action that can be taken on the device by the code portion at the user device, where displaying content is just one example. In one example, in response to a segment changing, an action could be executed to make an API call to flag a user as having some affinity for a particular topic of interest, for instance within an audience API of a social network such as Facebook. In this example, it is possible that no content would be displayed to the user, but instead the flag is set for targeting the user via the social network at a later date. In another example, the action executed relate to email, for instance the action may cause an email to be transmitted based on the collated user data.

The Webpage Server Perspective

A website provider may embed content (e.g. adverts) in their webpages. The following subsection describes, from their perspective, the process that is undertaken to generate and deliver targeted adverts in their webpages.

Figure 3:
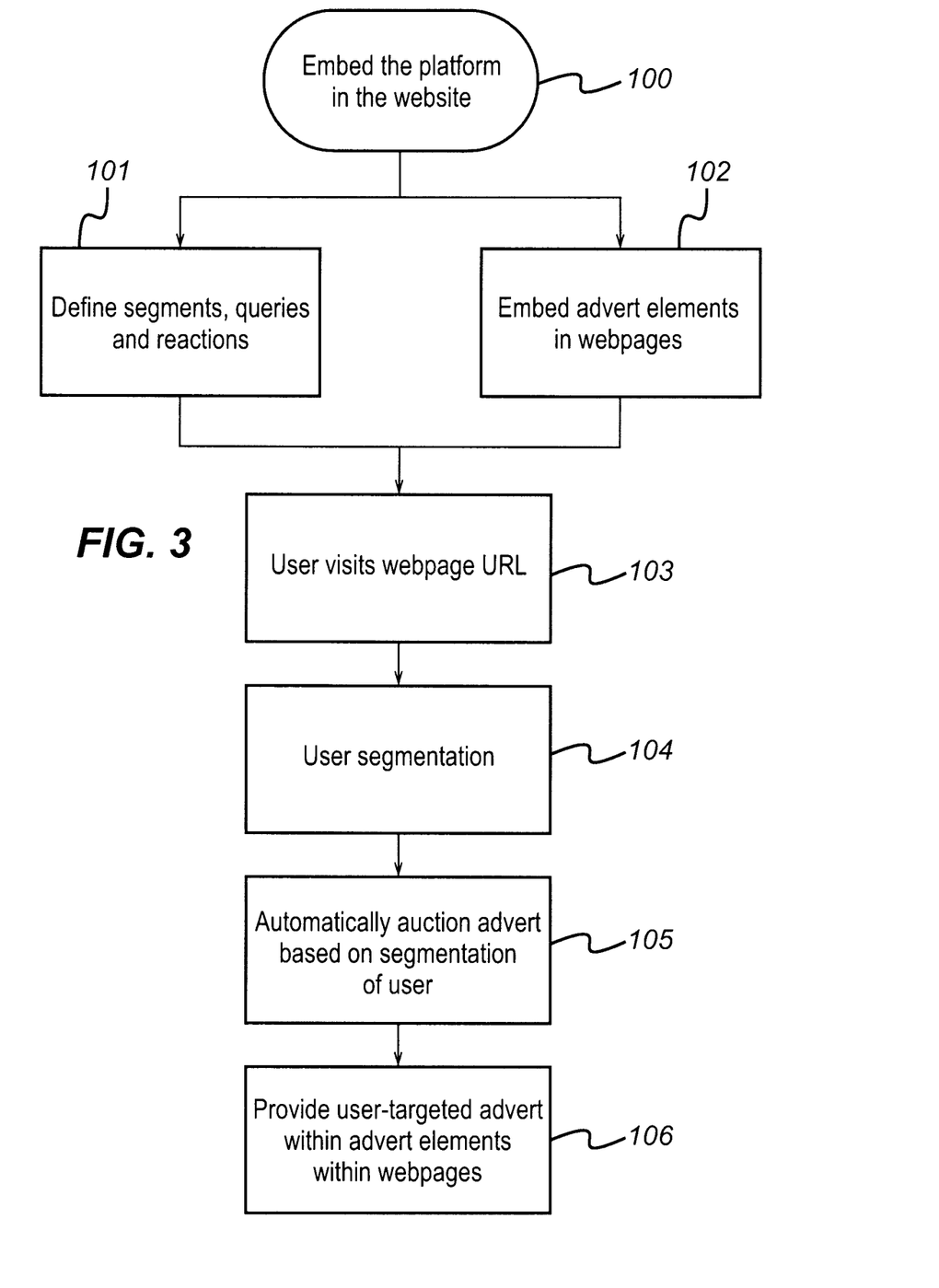
FIG. 3 illustrates a flow chart from the perspective of the web element server.

The flowchart from the perspective of the webpage server of the disclosed invention at a high-level is illustrated in FIG. 3. Once the platform is embedded in their website (100), the system is capable of automatically collecting default events and segments, queries and reactions (101) can be defined in the dashboard.

The website may contain advert elements on their webpages which are to feature targeted advertisements (102). An advert element is a space or region on a webpage where an advert can be placed. It could be, but is not limited to, a rectangular box, a square box, a banner, a pop-up browser window or sponsored content. The more advert elements are created by the partner, the more opportunities the platform has to tailor adverts for the visitors to the webpages. Although the flowchart shows (101) and (102) in parallel, the segments, queries and reactions can be defined before the advert elements are embedded on the partner's webpages, in parallel to the creation of said webpages or after the webpages have been published.

Once the segments, queries and reactions are set up, if a user visits a webpage which has one or more embedded adverts (103), then the user is segmented (104) according to their previous and ongoing events. This user segmentation process helps inform the automatic auction of the advertising element that takes place (105). The result of this auction is a user-targeted advert placed in the advert element on the webpage (106).

Segments

A segment processes a user's event history and returns a Boolean TRUE or FALSE output for a given user.

To define when the platform should react, a user of the platform must create one or more segments in the browser-based dashboard. The user needs to specify the typical behaviour and attributes, the profile, of a typical advertising target user by defining criteria over a user's events.

Metadata associated with the segment may be required including the name of the segment, the tags associated with it which facilitate easier filtering and searching of the segments, and a description of the segment. Following these inputs, the aforementioned behaviour or profile of a user who fits the segment criteria is defined.

As an example of a situation in which a segment needs to be created, suppose that a user is a newspaper with an online presence which uses the system who have a webpage with an advert space that they wish to sell. The newspaper wishes to create a segment for business analysts who are searching for a job. The newspaper, in this example, would create a segment. In this example, were a user matching the segment criteria to visit the webpage with the advert space, the segment would flag that instance by changing the state of the user, for example, from FALSE to TRUE. The platform would then react as instructed to this event. This segment of user could, for example, be of interest to a consulting firm who had a job listing who could then bid for the advertising element(s) on the webpage which are being loaded in front of this user.

Queries

Queries, as with segments, process a user's event history in response to a user's behaviour or profile. However, queries are capable of more complex logic which require the grouping or aggregation of data. In the preferred embodiment, mathematical functions including, but not limited to, average, sum, count, maximum and minimum are supported in queries. A segment produces values of TRUE and FALSE that can be reacted to, whereas queries produce values of any particular type. For example, a query might calculate the average basket value for a user's purchase events. This then means a reaction to a query can determined based on any type of value, rather than just the TRUE or FALSE value afforded by a segment.

A query is written using the query language via a user interface. A segment is built using the segment builder interface in the dashboard.

Reactions

A reaction is the process by which segments can be passed to other platforms.

Segments are used to trigger a reaction. In the preferred embodiment, there are three types of trigger:
  i. On Entry: the reaction is triggered when the user enters the segment.
  ii. On Exit: the reaction is triggered when the user exits the segment.
  iii. Every Time: the reaction is triggered every time a user visits a page while in that segment.

The response of the platform to a trigger can be user defined, for instance via a user interface.

In the preferred embodiment, a user employs the herein described invention on their one or more webpage(s) to selectively target users who view their website with adverts tailored to the users' behaviour.

First Visit to a Webpage

Figure 4:
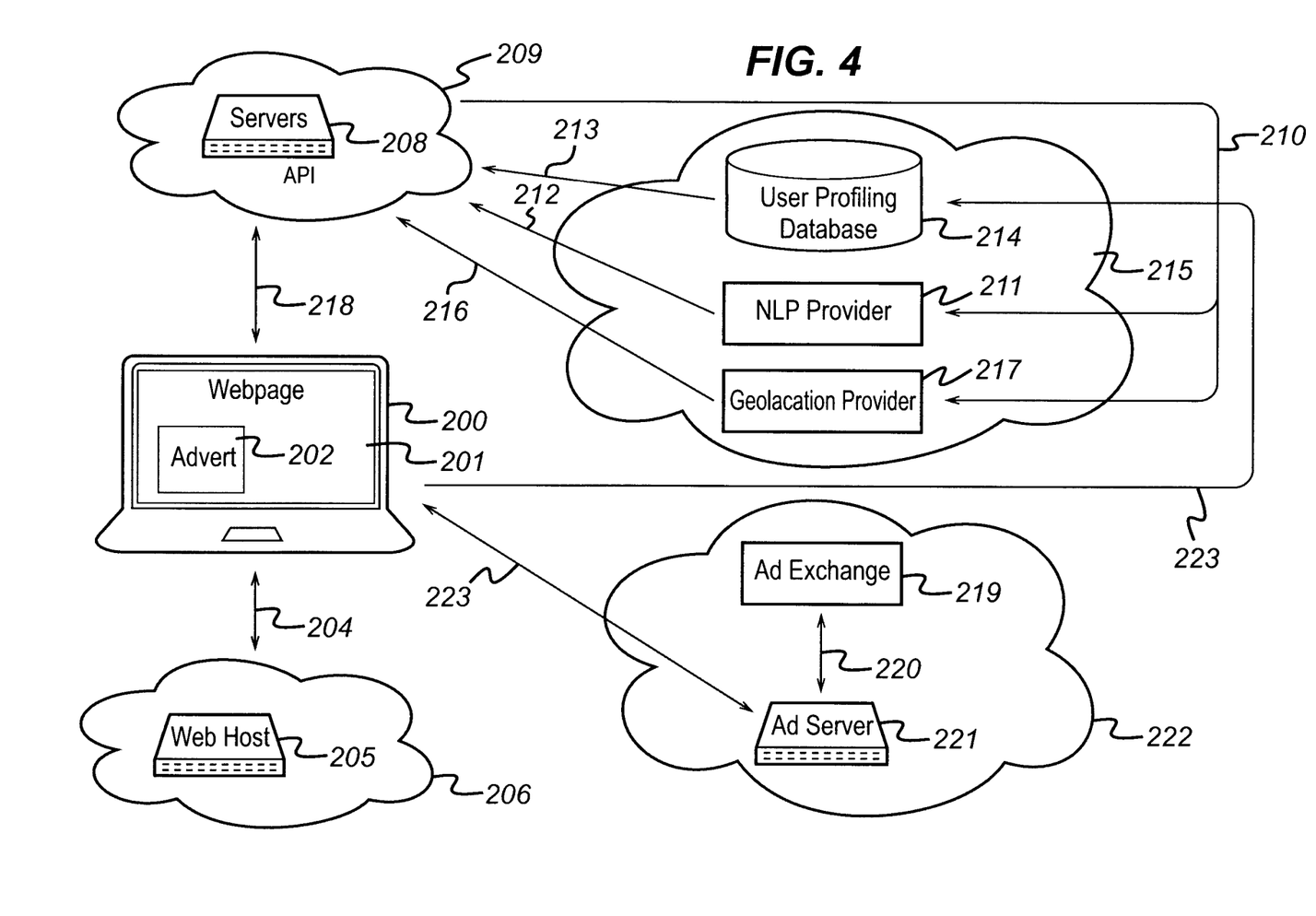
FIG. 4 illustrates a schematic of data transmitted between devices in the system.

In the preferred embodiment of the disclosed invention, there are five groups of components, as illustrated in FIG. 4. Firstly, there is the user's device (200) which accesses a targeted-advert embedded website. In communication with the user device (200) is the cloud server system (209), the data enrichment sources (215), the ad sales and distribution system (222) and the web hosting system (206).

The first step in the process for a user who has not previously accessed a website is the user's request for the webpage (201) on their device (200). The webpage (201) contains an advert element (202). The URL directs the browser to source the webpage by sending a message (204) to the web host's server (205). In response, the web host server (205) transmits (204) the webpage content in the form of HTML to the browser on the device (200) along with a JavaScript snippet which has been added to each webpage of the website. The snippet is then executed which pings the servers (208) and downloads and initialises the software development kit (SDK) (218).

In the preferred embodiment, user profiling information is sourced from the database of a company specialising in user data aggregation (214), such as "The Nielsen Company (US), LLC", which continuously streams data (213) to the servers' (208) API. The user information could include, but is not limited to: the user's gender, age and personal interests.

The servers (208) relay (210) the webpage information to the natural language processing (NLP) provider (211), such as IBM Watson, which extracts the concepts, tags or other enriched webpage data. In the preferred embodiment, the servers (208) contain, in its database, associations between the URLs and NLP provider classifications. If the NLP classifications are required, and if an event with a URL that exists in the database (208) is sent (218) to the API, then the API uses the database to enrich the event with the NLP provider classification stored in the database (208). If no classification for the URL exists in the database (208), a request (210) is sent to NLP provider (211) with the text body of the URL. The response (212) from the NLP provider (211) is sent to the servers (208) where it is stored in the database for future classification requests.

In an alternative embodiment, the NLP provider's output is transmitted (212) directly to the user's device (200) where that data is combined with the other user data for the user segmentation. The information is then synchronised (218) with the servers (208).

In another alternative embodiment, known as client-side enrichment, webpage information is transmitted (223) directly from the device (200) to the user profiling database (214) or data enrichment provider.

Another form of enrichment, geolocation, relies on the supply of the user's IP address. A request for this enriched data is pushed (210) from the API (208) to the geolocation provider (217). The geolocation provider (217), such as GeoIP, sends back (216) enriched location data about the user. That data is then relayed (218) to the SDK in the user device (200).

In an alternative embodiment, the requests and transmission of data to and from the geolocation provider (217) does so directly to and from the user device (200), bypassing the servers (208).

In alternative embodiments, other data sources may be used to provide additional enriched content such as, but not limited to: taxonomies, such as the IAB advert taxonomy and internet service provider details and business information, from companies such as APIHub, Inc ("Clearbit").

The servers sends (218) the SDK to the user's device (200) where it is stored in the browser's local storage on the device (200).

Following segmentation of the user, information regarding the advert element and the category of user is sent (223) from the browser to the ad server (221). The ad server (221) then forwards (220) this information to the ad exchange (219) for the auctioning of the advert element. After the auction for the advert has been completed, a message is sent (220) to the ad server (222) requesting the advert which won the bid. The advert is then sent (223) to the browser in the user's device (200) where it is embedded into the webpage (201) in the advert element (202).

In the preferred embodiment, encryption is applied to one or more of the communication channels to protect the user data that is being transmitted between devices in the system, as illustrated in FIG. 4.

Figure 5:
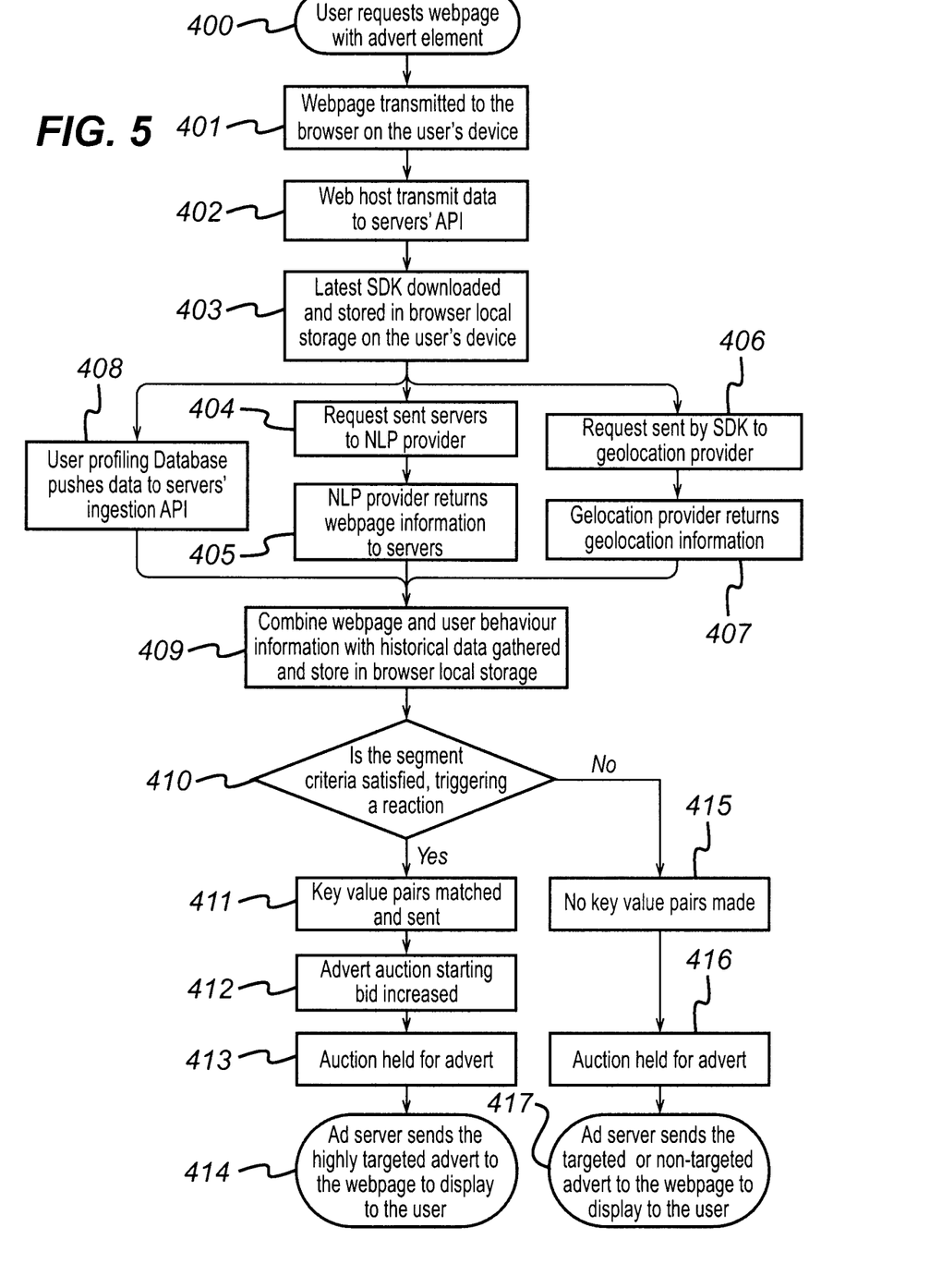
FIG. 5 illustrates a flow chart of the method of Figure in greater detail.

The content (e.g. an advert) selection process described above has been visualised in a flowchart which can be seen in FIG. 5.

The process from a user's request for a webpage to the user segmentation, (400) to (410), is as described in the description for FIG. 4. The alternative embodiments such as the additional types of enriched content and alternative transmission of data between 3rd party enrichment source, the servers and the user's device are omitted from FIG. 5 but are still within the scope of the invention.

Elements (411) to (414) in FIG. 5 illustrate the sequence of events when key value pairs are made from the user segmentation. The key value pairs are then used in the header bidding process. Header bidding is an important new programmatic technique whereby the publisher conducts an auction on every page load, before ad placements load on the page. The auction takes place outside of the publisher's advertising server—in the header of their web page in the user's browser—such that the publisher controls the auction. As the page begins to load, the user's browser calls all of the publisher's demand partners simultaneously, and each makes bids for slots on the user's page. In contrast to the traditional sequential waterfall of ad exchange floor prices, advertisers are able to look at every impression, and publishers are able to pick more valuable advertisements ahead of direct orders.

The system's real-time, on-device capabilities allow publishers to take advantage of header bidding. By setting up the publisher's page to convert header bids into events (e.g. with the bid price as a property of the event), queries can be created to calculate the average, minimum and maximum bids for users in real-time, and real-time reactions setup that add information to the auction in real-time to affect its efficiency. For example, by taking the minimum of the winning bids, the floor price for an auction can be set to this minimum, meaning that bidding kicks off higher so that there's more time for the value of the bid to rise over the limited time period for which the auction runs.

In contrast, if a user's information does not fit the criteria of a segment, the default advertisement server process is followed whereby a certain amount of personalisation of the ad to the user may still be possible, but not to the same extent as shown by the alternative path illustrated in FIG. 5.

In the preferred embodiment, the time elapsed between the webpage being requested by the user (400) and the advert being transmitted from the ad server (414) or (417) is of the order of 200 milliseconds; the advert is transmitted to the device before the webpage finishes loading.

Return Visit to a Webpage

The process governing the delivery of a targeted ad featured on a subsequent visit to a webpage is described herein.

In contrast to the first visit of a user to a webpage, in this instance the user's device already has the SDK in the browser's cache. If a more recent version of the SDK is available or if a new or updated segment is available, then it is downloaded from the servers. A recent subset of the user data gathered from former visits to websites is stored in the cache. The state, stored and executed in the SDK, is up-to-date to reflect the data that has previously been obtained. This return visit generates an event(s) which prompts the state to update again. If reactions have been set and are triggered by a change to the state, these are implemented. The process of advert auctioning as described in the previous section and shown in FIG. 5 is the same, although on a return visit, as there is now a historic database of user data to supplement the data generated from this visit, a greater amount of user data is available to tailor the advert delivery. For example, the accumulation of concept tags for the webpages that the user has visited and is visiting better informs the system as to the user's interests. This data is used to generate more key-value pairs, or more accurate key-value pairs, which is likely to result in an improved user-advert matching in the auction.

Segment Implementation

To capture the behaviour of users on their devices, the segments are distributed to any user which accessed a webpage which has the platform running on it. In the preferred embodiment, the segments are distributed in the form of a JavaScript SDK. The flowchart in FIG. 6 details the steps involved in the backend of the platform required in to update a segment.

Figure 6:
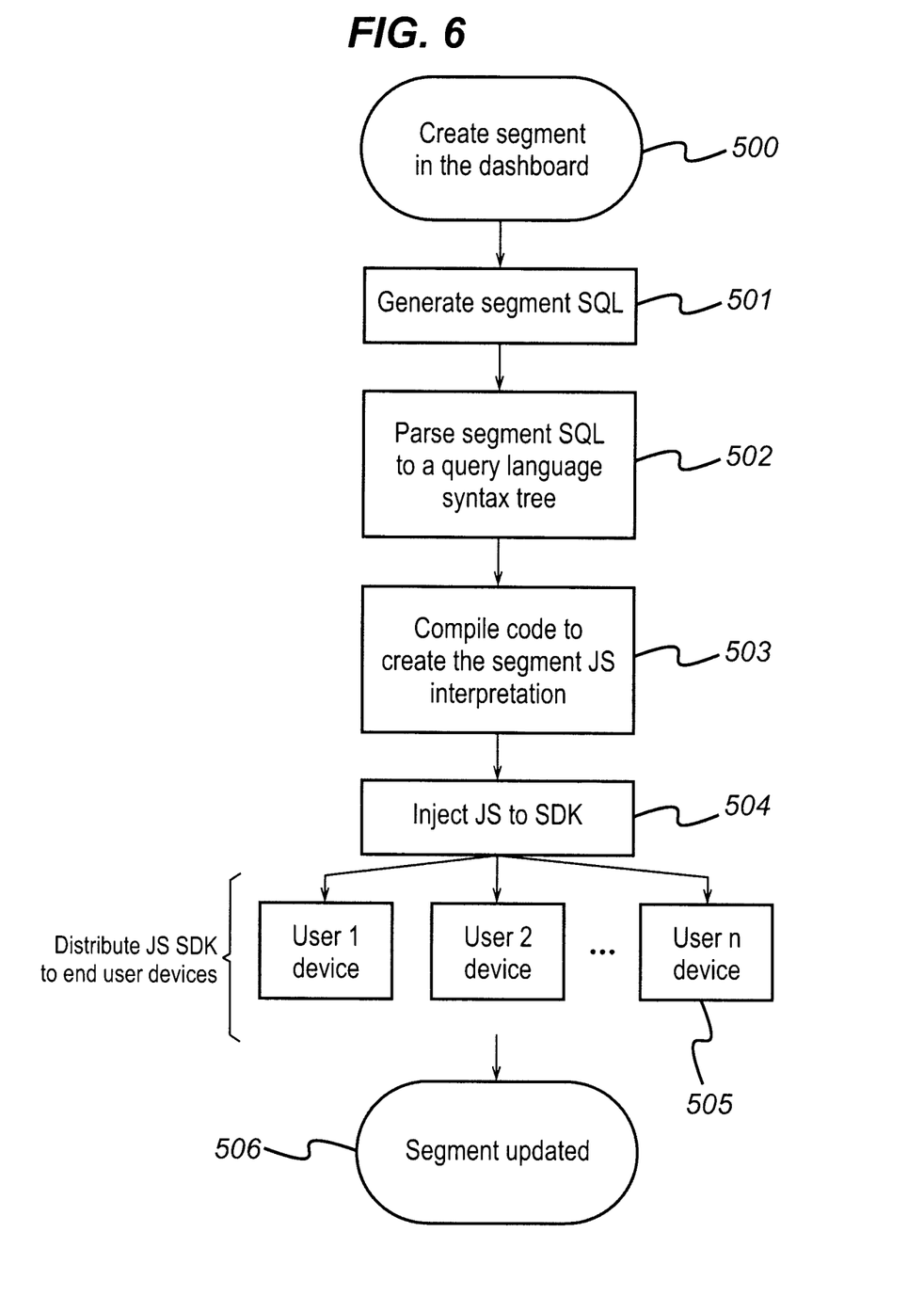
FIG. 6 illustrates a flow chart of a method performed by the code provisioning server.

The information captured in this visit to the webpage adds to the previously captured historic data of websites visited by the user in the browser's local storage of the device (200), also known as the cache.

A segment can be created and its logic defined in the dashboard segment builder (500). In the preferred embodiment, this can be performed on any internet-connected device. Once this is completed, the centralised servers generate the segment SQL (501). In the preferred embodiment, the SQL (501) is then parsed to a query syntax tree (502) before being compiled to create the segment JavaScript (503), C, or other interpretation. The next step of injecting the JavaScript into the SDK (504) is illustrated FIG. 7.

Figure 7:
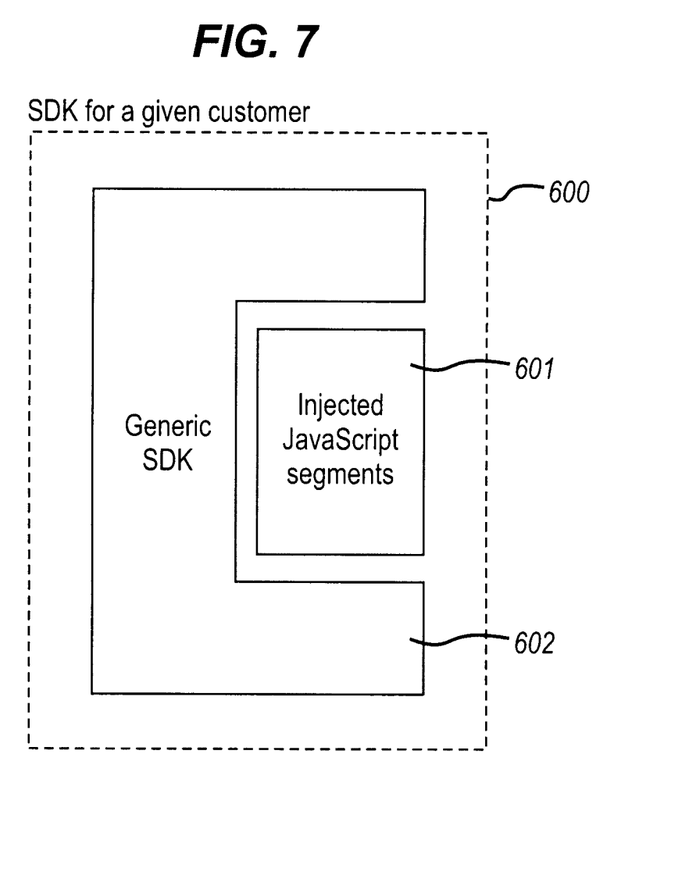
FIG. 7 illustrates injecting JavaScript into a software development kit.

The SDK (600) distributed to a customer's users' end devices (505) and stored in their respective browser cache has two components: the generic SDK (602) and the injected JavaScript segments (601).

The generic SDK (602) performs several key roles. These are:
  i. Ingestion: Capturing user behaviour as user events and pinging them to server API.

ii. Segment processing: Responsible for feeding events into the update function which takes the event and the current state and produces the new state.
iii. Reacting: Deciding, based on the new state, whether or not to trigger a reaction.
iv. Local storage management: Managing the segments stored in the cache.
v. Syncing with cloud: pushes events generated locally to the server for a centralized copy, and pulls events from the centralized copy if necessary (e.g. if a user was logged in on another device and generated events there).

Updates to the generic SDK are infrequent and will often only occur when there is an improvement to the performance of the code or a bug fix. The SDK is stored on the device (200) in the browser's cache.

Whenever a user makes a change to their segments or queries, the injected segments are updated and downloaded onto a user's device the next time they access one of the user's webpages.

State

A state is a piece of data or a data structure that represents the minimum required information which encapsulates all of the necessary information from the events in order to produce a segment result. These states are updated incrementally and can be updated in response to past events associated with a particular user. In addition, these states can be updated in response to a new event that occurs once the SDK is downloaded onto the user's device.

In one example embodiment, if the result is an average, two pieces of data need to be captured in the state. Namely, in this case, the sum and the count. The segment result can then be computed, by simply dividing the sum by the count.

The information regarding the user, the webpage and the advert element is sent to an auction for the advertising element in the ad exchange. Exploiting the user's segmentation, key value pairs can be created. The key value pairs provide more information about the user, and therefore make an advertising party sitting on a programmatic exchange more willing to pay more if they wish to target this audience with their messaging.

User Data Storage

Each user's profile data is associated with a unique user ID which, in the preferred embodiment, which takes the form of a unique string of characters. A user's multiple devices may be linked in the database by email address, PayPal number or another form of ID. This can be done by forming a link between the user input at a log-in page of a website and the unique user ID in the system.

Every time a user accesses a website, the data from that visit or event is appended to their user data as an event. Some user-defined segments benefit from the accumulation of a larger amount of data, such as one based on an averaging function, since more data means a more accurate average. A larger number of visits of users to those sites generates more data. This data is used to generate more accurate segments, and therefore more accurate key-value pairs, which is likely to result in an improved user-advert matching in the auction.

In the database, after the users' data is received by the API of the servers, a streaming data pipeline is used before the data is partitioned by user. The streaming data pipeline allows for processing large scale data analysis, whereas the partitioned data storage facilitates the distribution and synchronisation of that data with the user devices to enable edge computing.

It is a further aspect of the invention to be implemented without the use of cookies. The invention can be implemented such that local storage means of the users' devices are utilised, negating the need to store 3rd party cookies; it is a cookie-less solution. 3rd party cookies are becoming increasingly restricted for privacy concerns. Hence, this solution is not subject to those restrictions.

Synchronisation

The user profile data is synchronised between the user device (200) and the centralised cloud-based servers when a user's device (200) is accessing a webpage. In the preferred embodiment, owing to the storage constraints on the local devices (200), only a subset of the data relating to the most recent events is stored in the browser's local storage in the device (200) while the centralised servers store the complete dataset. In the preferred embodiment, the data is stored in a compressed format in the local storage in the device (200), increasing the proportion of the user's data which is stored locally.

If a new device for a given user accesses a webpage, the data on the user which is already stored in the servers is downloaded onto the device, to the extent that the cache can support as previously eluded to.

If a new segment or query is created which requires information from historic data, once the segment has been injected into the generic SDK and sent to the user's browser, all the historic data will be sequentially pulled from the servers. As the events are downloaded, edge computing is employed to process the segment or query on the user's device; the SDK on the device runs through all the events as they are downloaded. Although all the events are downloaded, as before, only the most recent events are then stored in the local device's browser's cache. The result from the edge processing is a final state which has been run over all the user's data. In an alternative embodiment, the processing of a new segment or query is carried out on the user's data in the cloud.

Other Additional Use-Cases

IPTV is a potential use-case for the disclosed invention whereby personalised adverts are supplied via the internet to users watching shows either during ad breaks, on a banner or in another picture-in-picture format. Crucially, tailored ads specific to the user are provided from the first time they access a channel and the user data is constantly being updated as information about the programs they watch is added to the user information database.

Interactions with smart posters lends itself to this invention due to the need for tailored advertising from the first visit or interaction with the poster. Other, non-real time solutions would likely be challenged by the typically short visit duration and the low, even zero, frequency of return visits.

The ability of the solution described herein to analyse vast quantities of data in real-time using hybrid computing is suitable for "Internet of Things" ("IoT") devices. Rather than a user's activity and behaviour being monitored, sensor data would be tracked from the IoT device, for example a refrigerator's internal temperature or the smart house's energy usage. The data could be segmented by IoT device. Content, products or services could be supplied to the IoT device owners based on the data gathered from them. In another potential use case, this solution could be combined with an online, holistic tool for monitoring, tracking and managing the IoT devices.

Marketing, e.g. providing tailored product recommendations or ordering lists of products or services by user preference on a retailer's site, is another viable use case for the disclosed invention.

Another potential use of this invention is in ecommerce. In addition to the use of the invention in marketing in the shopping space, the invention could also find use in the backend systems of financial transactions processes. Profiling customers by aggregating their data from multiple sources and monitoring a user's spending habits to authorise transactions is likely to become more common. The edge computing aspect of this invention could be particularly useful in the case of e-wallets or smart-cards which can have their own processing means.

Anomaly detection is yet another use case for the platform. Examples of anomaly detection include: detecting fraudulent traffic and identifying users with ad-blocking software installed. The ability to process such large quantities of data and react to the data in such a short period of time lends itself well to these applications. For detecting fraudulent traffic, analysis can be carried out on a user's webpage view time, data for which could be captured by the system. The system is also capable of determining how many adverts a user has viewed while monitoring how many of the webpages they have viewed. This information could be used to establish whether the user has an ad-blocker running on their device's browser.

Gaming is another potential use-case for the invention. Either for the supply of targeted in-game advertising or for real-time analysis of, or reaction to, game-play of users. Alternatively, it could be an integral aspect of the game itself where an element of the game relies on the attributes of certain elements processed in real-time.

Other instances of "live" user interaction where there is merit in providing user-specific content on-the-fly.

Example Electronic Device

Figure 8:
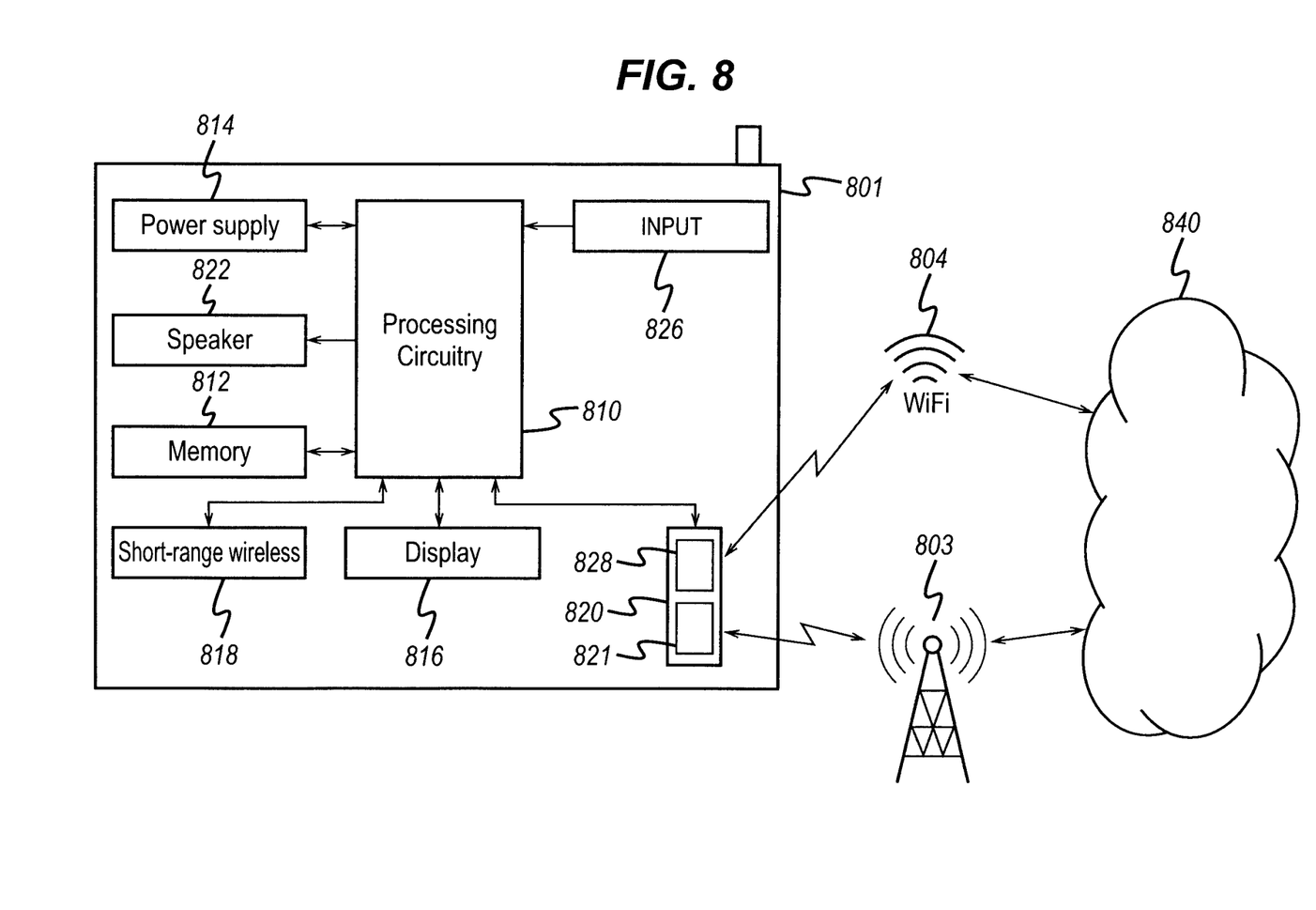
FIG. 8 illustrates a schematic of an example device in the system.

FIG. 8 shows an exemplary electronic device 801 according to any of the electronic devices of this disclosure (such as the user device 3, the web element server 5, the content server 9, the code provisioning server 7 or the data enrichment server 11). The electronic device comprises processing circuitry 810 (such as a microprocessor) and a memory 812. Electronic device 801 may also comprise one or more of the following subsystems: a power supply 814, a display 816, a short-range wireless transceiver 818, a long-range wireless transceiver 820, a speaker 822 and an input 826.

Processing circuitry 810 may control the operation of the electronic device 801 and the subsystems 812-822. Processor 810 is communicatively coupled with subsystems 812-828. Memory 812 may comprise one or more of random access memory (RAM), read only memory (ROM), non-volatile random access memory (NVRAM), flash memory, other volatile memory, and other non-volatile memory.

Display 816 may be communicatively coupled with the processing circuitry 810, which may be configured to cause the display 816 to output images. The display 816 may comprise a touch sensitive interface, such as a touch screen display. The display 816 may be used to interact with software that runs on the processor 810 of the electronic device 801. The touch sensitive interface permits a user to provide input to the processing circuitry 810 via a discreet touch, touches, or one or more gestures for controlling the operation of the processing circuitry and the functions described herein. It will be appreciated that other forms of input interface may additionally or alternatively be employed for the same purpose, such as the input 826 which may comprise a keyboard or a mouse at the input device.

Short-range wireless transceiver 818 may be a short-range radio that is configured to operate according to a short-range wireless protocol. Short-range wireless transceiver 818 may be configured to communicate via a short-range wireless protocol. The short-range wireless protocol may be Bluetooth, or Bluetooth Low Energy, or Bluetooth Smart, and the short-range wireless transceiver may be configured to communicate with other devices, such as a wireless beacon, according to such a protocol. In this regard and for the purposes of all embodiments herein concerning a short-range wireless protocol, the short-range wireless protocol may be a protocol which is capable and designed for communication over less than 1, 5, 10, 20, 30, 40, 50, or 100 m.

Long-range wireless transceiver 820 may be one or more long-range RF transceivers that are configured to operate according to communication standard such as LTE, UMTS, 3G, EDGE, GPRS, GSM, and Wi-Fi. For example, electronic device 801 may comprise a first long-range wireless transceiver 821, such as a cellular transceiver, that is configured to communicate with a cell tower 803 via to a cellular data protocol such as LTE, UMTS, 3G, EDGE, GPRS, or GSM, and a second long-range wireless transceiver 828, such as a Wi-Fi transceiver, that is configured to communicate with a wireless access point 804 via to a Wi-Fi standard such as 802.11 ac/n/g/b/a. In this regard and for the purposes of all embodiments herein concerning a long-range wireless protocol, a long-range wireless protocol may be a protocol which is capable and designed for communication over 5, 10, 20, 30, 40, 50, or 100 m. This is in contrast to short-range wireless protocol mentioned above. The long-range wireless protocol may communicate utilizing higher power than the short-range wireless protocol. The range (e.g. line of sight distance) between the long-range end nodes (electronic device and router or base station) for the long-range wireless protocol may be greater than the range (e.g. line of sight distance) between the short-range end nodes (e.g. electronic device and wireless beacon).

Electronic device 801 may be configured to communicate via the long-range wireless transceiver 820 with a network 840. Network 840 may be a wide area network, such as the Internet, or a local area network. Electronic device 801 may be further configured to communicate via long-range wireless transceiver 820 and network 840 with one or more servers or user devices. These servers or user devices may be any one of those described herein.

The term "comprising" encompasses "including" as well as "consisting" e.g. a composition "comprising" X may consist exclusively of X or may include something additional e.g. X+Y.

The word "substantially" does not exclude "completely" e.g. a composition which is "substantially free" from Y may be completely free from Y. Where necessary, the word "substantially" may be omitted from the definition of the invention.

The term "about" in relation to a numerical value x is optional and means, for example, x+10%.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium.

Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

It will be appreciated that the modules described herein may be implemented in hardware or in software. Furthermore, the modules may be implemented at various locations throughout the system.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the module described above may be implemented in hardware or software.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A system for displaying content to a user, the system comprising a user device, a web element server and a code provisioning server:
   wherein the user device is arranged to initiate a web element request indicative of a web element;
   the web element server is arranged to transmit the web element to the user device in response to the web element request;
   the code provisioning server is arranged to receive a code portion request in response to the web element request;
   the code provisioning server is arranged to transmit a code portion to the user device in response to the code portion request;
   the user device is arranged to execute the code portion in response to the web element request, wherein:
   executing the code portion causes a processor at the user device to collate user data at the user device;
   executing the code portion causes a processor at the user device to generate an instruction to execute an action based on the collated user data; and
   executing the code portion causes a processor at the user device to associate the user with at least one of a plurality of categories.

2. The system of claim 1 wherein the instruction to execute an action comprises a content instruction to display content at the user device, wherein the content is based on the collated user data; and wherein executing the code portion causes a processor at the user device to display the content in response to the content instruction.

3. The system of claim 1 wherein the instruction to execute an action comprises generating a flag instruction to associate a flag with a user of the user device, wherein the flag is based on the collated user data.

4. The system of claim 1 wherein the action is selected based on the at least one predefined category associated with the user.

5. The system of claim 1 wherein generating the instruction comprises transmitting, from the user device to a content server, the instruction comprising a data item indicative of at least a portion of the collated user data.

6. The system of claim 5 wherein the content server is arranged to transmit content based on the portion of collated user data, in response to the content instruction.

7. The system of claim 1 wherein generating the instruction comprises transmitting, from the user device to a content server, the instruction comprising a data item indicative of the at least one category.

8. The system of claim 7 wherein the content server is arranged to transmit content based on the at least one category to the user device, in response to the content instruction.

9. The system of claim 1 wherein the code provisioning server is arranged to define a plurality of categories, and transmit at least a subset of the plurality of categories to the user device in response to the code portion request.

10. The system of claim 1 wherein defining a category comprises selecting at least one criterion for the category; and wherein associating the user with a category comprises matching at least a portion of the collated user data with the at least one criterion of the category.

11. The system of claim 2 wherein displaying the content in response to the content instruction comprises embedding the content in the web element.

12. The system of claim 1 wherein the user device is arranged to: initiate an additional web element request indicative of a web element, and determine that a version of the code portion at the user device corresponds with a version of the code portion at the code provisioning server.

13. The system of claim 12 wherein the user device is arranged to receive the version of the code portion at the code provisioning server, in response to determining that the version of the code portion at the user device does not correspond with a version at the code provisioning server.

14. The system of claim 12 wherein the version of the code portion at the code provisioning server is the most recent version.

15. The system of claim 1 wherein the web element comprises at least one of a webpage, video content and an online game.

16. The system of claim 1 wherein associating the user with at least one of a plurality of categories comprises at least one of:
   detecting if the collated user has transitioned from a negative state of not matching a criterion of at least one of a plurality of categories to a positive state of matching the category;
   detecting if the collated user has transitioned from a positive state of matching a criterion of at least one of a plurality of categories to a negative state of not matching the category;
   detecting if the collated user matches a criterion of at least one of a plurality of categories; and
   detecting if the collated user has transitioned from one query value to a new query value.

17. The system of claim 1 wherein the web element server is arranged to transmit a code snippet to the user device in response to the web element request; and
   the user device is arranged to execute the code snippet to initiate the code portion request.

18. A server for displaying content to a user at a user device, the server comprising a processor configured to perform the steps of:
   receiving a code portion request in response to a web element request initiated at the user device; and
   transmitting a code portion to the user device in response to the code portion request;
wherein:
the code portion is arranged be executed at the user device and cause a processor at the user device to collate user data at the user device;
the code portion is arranged be executed at the user device and cause a processor at the user device to generate an instruction to execute an action based on the collated user data; and
the code portion is arranged be executed at the user device and cause a processor at the user device to associate the user with at least one of a plurality of categories.

19. A method for displaying content to a user at a user device, the method comprising:
   initiating, at the user device, a web element request indicative of a web element;
   transmitting, at a web element server, the web element to the user device in response to the web element request;
   receiving, at a code provisioning server, a code portion request in response to the web element request;
   transmitting, at the code provisioning server, a code portion to the user device in response to the code portion request;
   executing, at the user device, the code portion in response to the web element request,
wherein:
executing the code portion causes a processor at the user device to collate user data at the user device collate user data at the user device;
executing the code portion causes a processor at the user device to generate an instruction to execute an action based on the collated user data; and
executing the code portion causes a processor at the user device to associate the user with at least one of a plurality of categories.

* * * * *